United States Patent [19]

Suzuki et al.

[11] Patent Number: 5,029,246

[45] Date of Patent: Jul. 2, 1991

[54] WIRE ELECTRICAL DISCHARGE MACHINING APPARATUS

[75] Inventors: Toshio Suzuki; Yoshio Shibata; Masato Banzai, all of Aichi, Japan

[73] Assignee: Mitsubishi Denki K.K., Tokyo, Japan

[21] Appl. No.: 472,154

[22] Filed: Jan. 30, 1990

[51] Int. Cl.$^5$ .............................................. B23H 7/10
[52] U.S. Cl. ............................. 219/69.12; 219/69.14
[58] Field of Search ................ 219/69.12, 69.14, 69.17

[56] References Cited

U.S. PATENT DOCUMENTS

| | | | |
|---|---|---|---|
| 4,484,052 | 11/1984 | Inoue | 219/69.12 |
| 4,495,393 | 1/1985 | Janicke | 219/69.12 |
| 4,564,431 | 1/1986 | Miyano | 219/69.12 |
| 4,575,603 | 3/1986 | Inoue et al. | 219/69.14 |
| 4,704,511 | 11/1987 | Miyano | 219/69.12 |
| 4,739,144 | 4/1988 | Shibata et al. | 219/69.12 |
| 4,814,574 | 3/1989 | Babel et al. | 219/69.12 |

FOREIGN PATENT DOCUMENTS

| | | | |
|---|---|---|---|
| 140134 | 9/1984 | Japan . | |
| 166426 | 9/1984 | Japan | 219/69.14 |
| 60-34230 | 2/1985 | Japan | 219/69.14 |
| 61-61717 | 3/1986 | Japan | 219/69.17 |
| 152326 | 7/1986 | Japan . | |
| 251123 | 10/1988 | Japan | 219/69.14 |

Primary Examiner—Geoffrey S. Evans
Attorney, Agent, or Firm—Sughrue, Mion, Zinn, Macpeak & Seas

[57] ABSTRACT

A wire electrical discharge machining apparatus comprising a nozzle for a machining liquid for jetting the machining liquid from a jet hole, a surrounding member for intercepting the flow of the machining liquid jetted from the nozzle so as to prevent the machining liquid from flowing out to a portion other than the spark gap, and a holding device for holding the surrounding member so as to removably mount the surrounding member on the nozzle and so that the surrounding member does not slip off while mounted. The holding device facilitates both the operation of mounting and dismounting the surrounding member on and from the nozzle and replacement of the surrounding member. Since the surrounding member does not slip off while it is mounted, smooth preparation and working is enabled.

14 Claims, 9 Drawing Sheets

WIRE ELECTRICAL DISCHARGE MACHINING APPARATUS

BACKGROUND OF THE INVENTION

1. Field of the Invention

The present invention relates to a wire electrical discharge machining apparatus and, more particularly, to the improvement of the holding mechanism and the mounting and dismounting operation of a surrounding member which is provided at the tip of a nozzle for jetting a machining liquid so as to efficiently supply the machining liquid to a spark gap.

2. Description of the Prior Art

FIG. 9 is an explanatory view of a conventional wire electrical discharge machining apparatus. A wire electrode 1 is supplied from a supply bobbin 2, and a brake roller 3 is connected to a solenoid brake 3a so as to impart a predetermined stretching force to the wire electrode 1. Idlers 4a, 4b and 4c are provided for changing the direction of travel of the wire electrode 1. A guide 5 is disposed in an upper nozzle 7 for a machining liquid so as to determine the upper position of the wire electrode 1, and a guide 6 is disposed in a lower nozzle 8 for a machining liquid so as to determine the lower position of the wire electrode 1. A pump 9 supplies a machining liquid 10 to the nozzles 7 and 8, and the machining liquid 10 is supplied to the machining portion from the respective jet holes 7a and 8a of the upper and lower nozzles 7 and 8. A machining power source 11 causes electrical discharge between the wire electrode 1 and workpiece 12 by applying a voltage. A roller 13 winds the wire electrode 1.

The operation of this apparatus will now be explained. The wire electrode 1 is supplied from the supply bobbin 2, provided with a stretching force by the brake roller 3 which is connected to the solenoid brake 3a, and is wound around the take-up roller 13 while the direction of travel of the wire electrode 1 is changed by the idlers 4a, 4b and 4c in the course of travel.

When the wire electrode 1 and the workpiece 12 are faced to each other through a small gap and a voltage is applied from the machining power source 11, the dielectric breakdown is caused, and the heat energy of discharge melts the metal of the workpiece 12 and removes it in tiny bits from the surface of the workpiece 12. This action is machining. The wire electrode 1 and the workpiece 12 are relatively moved with an appropriate gap therebetween while repeating discharge by a control device and a driving device (not shown), and as a result, an outline of a desired configuration is produced as if by a scroll saw.

At this time, the machining liquid 10 is jetted from the jet holes 7a and 8a of the upper and lower nozzles 7 and 8, respectively, to the spark gap by the pump 9 so as to wash away the molten machining refuse in the gap, recover the insulation, and cool the wire electrode 1 which is exposed to a high temperature by discharge. The gap between the surface of the workpiece 12 and the upper and lower nozzles 7 and 8 is ordinarily set at about 0.1 to several mm, and the width of the groove which has been machined into a predetermined configuration by electrical discharge machining is at most about 0.5 mm. Therefore, all the machining liquid 10 is not supplied to the spark gap, but it is branched into a machining liquid flow 10b which is supplied to the spark gap and a machining liquid flow 10a which flows on the surface of the workpiece 12, as shown in FIG. 10.

In order to increase the machining speed, the discharge energy is increased or the number of times of discharge is increased. In this case, however, the amount of machining refuse produced is increased and the temperature of the wire electrode 1 is raised, thereby disadvantageously making the machining unstable and inducing the disconnection of the wire electrode 1. It is therefore necessary to increase the flow velocity and the flow rate of the machining liquid 10 jetted from the upper and lower nozzles 7 and 8, thereby enhancing the capacity of eliminating the machining refuse and cooling the wire electrode 1. However, even if the supply voltage of the supply pump 9 is increased, most of the machining liquid 10 flows on the surface of the workpiece 12, as described above. That is, the amount of supply of the machining liquid 10 is scarcely increased in the spark gap to which the machining liquid 10 is to be supplied, and the speedup of the machining speed is therefore disadvantageously impossible.

Methods for solving this problem have been disclosed in Japanese Utility Model Laid-Open No. 140134/1984, and Japanese Patent Laid-Open Nos. 61717/1986 and 152326/1986 and are used. These are methods of providing a surrounding member 14 at the tip of the upper nozzle 7 and/or the lower nozzle 8 substantially coaxially with the wire electrode 1 so as to prevent the machining liquid 10 from being branched into the machining liquid flows 10a and 10b, as shown in FIGS. 11, 12 and 13. According to these methods, the machining liquid flow 10a which is about to flow on the surface of the workpiece 12 is intercepted by the surrounding member 14 and is supplied to the spark gap.

In a conventional wire electrical discharge machining apparatus having the above-described structure, since the surrounding member 14 slides on the surface of the workpiece 12, the surrounding member 14 is worn or is broken due to friction. The surrounding member 14 is therefore required to be easy to replace, and also to have a function of effectively intercepting the machine liquid flow 10a without leakage.

The conventional apparatus, however, cannot fully display these functions.

In the apparatus disclosed in Japanese Utility Model Laid-Open No. 140134/1984 and shown in FIG. 11, the surrounding member 14 is constituted by an O-ring and is inserted into the groove at the tip end surface of the nozzle 7 or 8. Therefore, although the replacement of the surrounding member 14 is easy, when the surrounding member 14 is separated from the workpiece 12 at a preparatory stage (the machining liquid 10 is not jetted) or at the time of finishing the roughly machined outline (the pressure of the machine liquid 10 is low), the surrounding member 14 is inconveniently slipped off the nozzle 7 or 8 under the weight of its own gravity or due to a shock.

In the apparatus disclosed in Japanese Patent Laid-Open No. 61717/1986 and shown in FIG. 12, the surrounding member 14 is composed of a sponge-like member. Therefore, when the pressure of the machining liquid supply pump 9 reaches approximately more than 10 kg/cm$^2$, deformation of the member by the machining liquid pressure and leakage from a hole are produced. Thus, this apparatus cannot be put to practical use.

In the apparatus disclosed in Japanese Patent Laid-Open No. 152326/1986 and shown in FIG. 13, since the surrounding member 14 is engaged with the recessed portion of the outer peripheral wall of the tip of the upper nozzle 7, the replacement of the surrounding member is not easy and the nozzle 7 as a whole must be replaced.

SUMMARY OF THE INVENTION

Accordingly, it is an object of the present invention to eliminate the above-described problems in the prior art, and to provide a wire electrical discharge machining apparatus which facilitates the mounting and dismounting operation of a surrounding member, and prevents the surrounding member from being slipped off while it is mounted.

To achieve this aim, the present invention provides a wire electrical discharge apparatus comprising: a nozzle for a machining liquid which is provided in such a manner as to face a workpiece at least on one side of the wire electrode receiving surface side and the wire electrode feeding surface side of the workpiece so as to insert a wire electrode therethrough and which has a jet hole for jetting the machining liquid to the workpiece therethrough; a surrounding member which is a cylindrical body surrounding the wire electrode, one end portion of the surrounding member being a contacting end portion which can be brought into close contact with the workpiece; and a holding means for holding the surrounding member at the tip of the nozzle so as to be removable and not to easily slip off such that the contacting end portion faces the workpiece and the close contacting end portion on the opposite side of the contacting end portion comes into close contact with the periphery of the jet hole of the nozzle.

According to the present invention, it is possible to efficiently introduce the machining liquid jetted from the nozzle to the spark gap by means of the surrounding member. In addition, since the surrounding member is held by the holding means so as to be removably mounted on the nozzle, replacement of the surrounding member is facilitated. Furthermore, since the surrounding member is held so as not to easily slip off, the surrounding member is prevented from slipping off while it is mounted.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained hereinunder with reference to the accompanying drawings.

Figure 1:
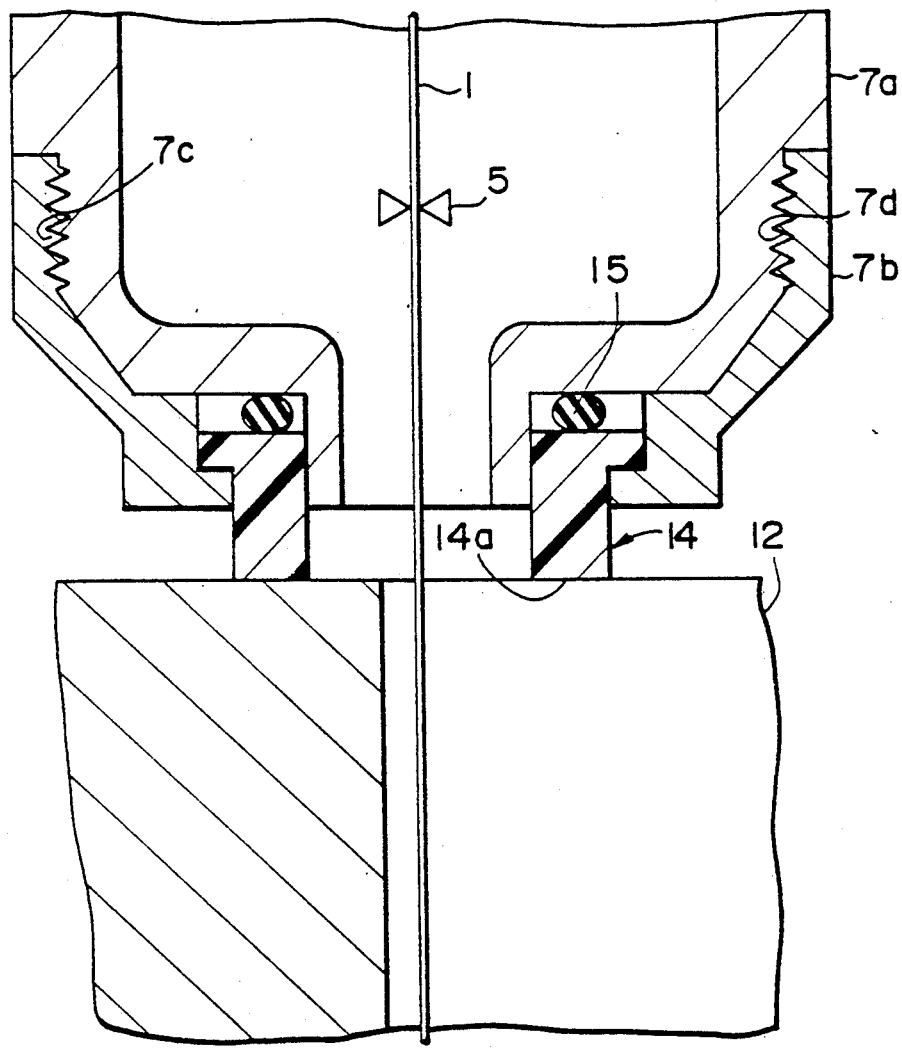
FIG. 1 is a detailed sectional view of an upper nozzle for a machining liquid and the vicinity thereof in a first embodiment of a wire electrical discharge machining apparatus according to the present invention.

FIG. 1 is a sectional view of the upper nozzle for a machining liquid and the vicinity thereof in a first embodiment of the present invention. An upper nozzle cap 7b as a holding means is mounted at the tip of the upper nozzle body 7a. The surrounding member 14 is formed into a cylindrical body. In this embodiment, the surrounding member 14 is constituted by a Teflon ring with a flange.

An O-ring 15 made of an elastic material is disposed between the upper nozzle body 7a and the surrounding member 14.

Figure 2:
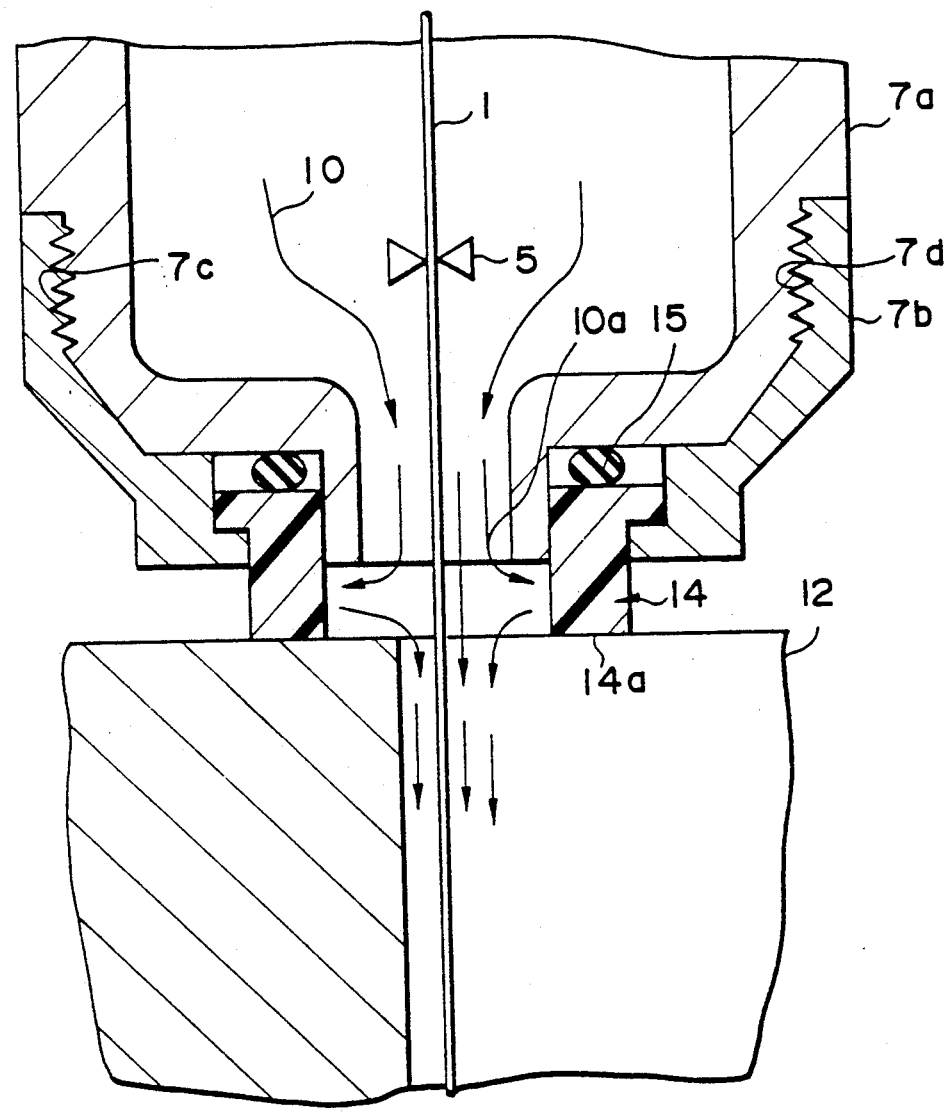
FIG. 2 is an explanatory view of the flow of the machining liquid in the upper nozzle in the first embodiment shown in FIG. 1.

The operation of this embodiment will now be explained. The nozzle cap 7b is attached to the upper nozzle body 7a by engaging a screw portion 7c formed on the outer peripheral wall of the nozzle body 7a with a screw portion 7d formed on the inner peripheral wall of the nozzle cap 7b. The nozzle cap 7b has a function of attaching the Teflon ring 14 with a flange (hereinunder referred to as "Teflon ring") to the tip of the nozzle 7. The O-ring 15 is not essential, but if the O-ring 15 is provided between the nozzle body 7a and the Teflon ring 14, the contacting end portion 14a is brought into closer contact with the surface of the workpiece 12 due to the elasticity of the O-ring 15 or the inclination of the workpiece 12 can be absorbed. The Teflon ring 14 is so set that the contacting end portion 14a thereof comes into contact with the surface of the workpiece 12. The reason why the surrounding member 14 is made of Teflon is that Teflon has a small friction coefficient. The Teflon ring 14 wears because it comes into contact with the workpiece 12 and slides on the surface of the workpiece 12. If the surface state of the workpiece 12 is bad, there is a possibility of the Teflon ring 14 being broken. That is, the Teflon ring 14 is an expendable supply. When the Teflon ring 14 is worn or broken, it is removed by turning the nozzle cap 7b so as to remove the nozzle cap 7b from the nozzle body 7a. In this way, it is unnecessary to replace the nozzle 7 as a whole, which is expensive and is difficult to handle, and the simple replacement of the Teflon ring 14, which is an expendable supply and easy to replace, suffices. The fundamental function of the Teflon ring 14, namely, the interception of the flow of the machining liquid 10 is carried out in the same way as in the prior art, as shown in FIG. 2. Since the Teflon ring 14 is provided with a flange, even if the Teflon ring 14 is separated from the workpiece 12 by lifting the nozzle 7, the Teflon ring 14 does not slip off the nozzle 7.

Figure 3A:
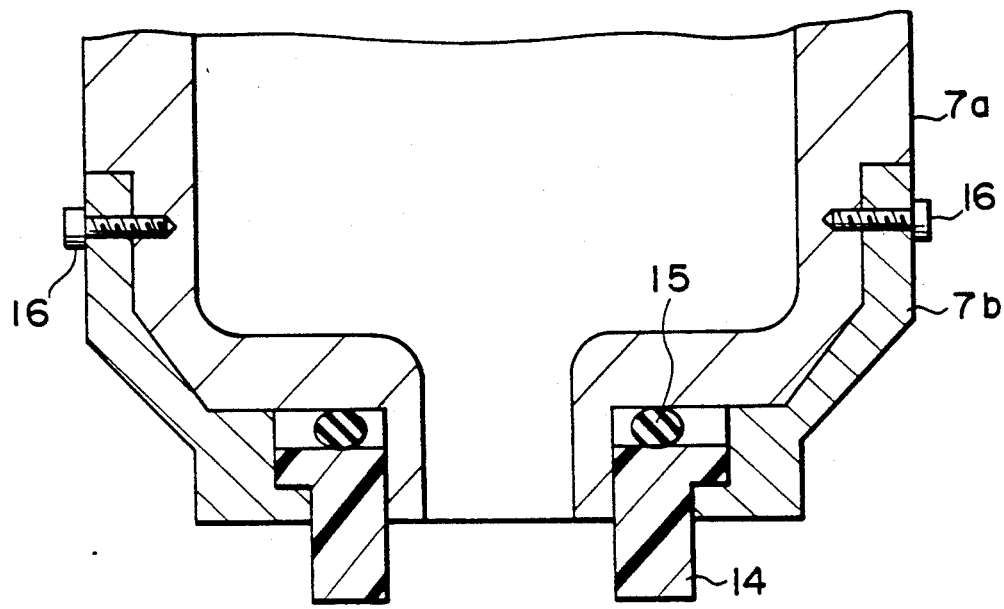
FIG. 3 is a detailed sectional view of an upper nozzle for a machining liquid and the vicinity thereof in a second embodiment of an apparatus according to the present invention.
Figure 3B:
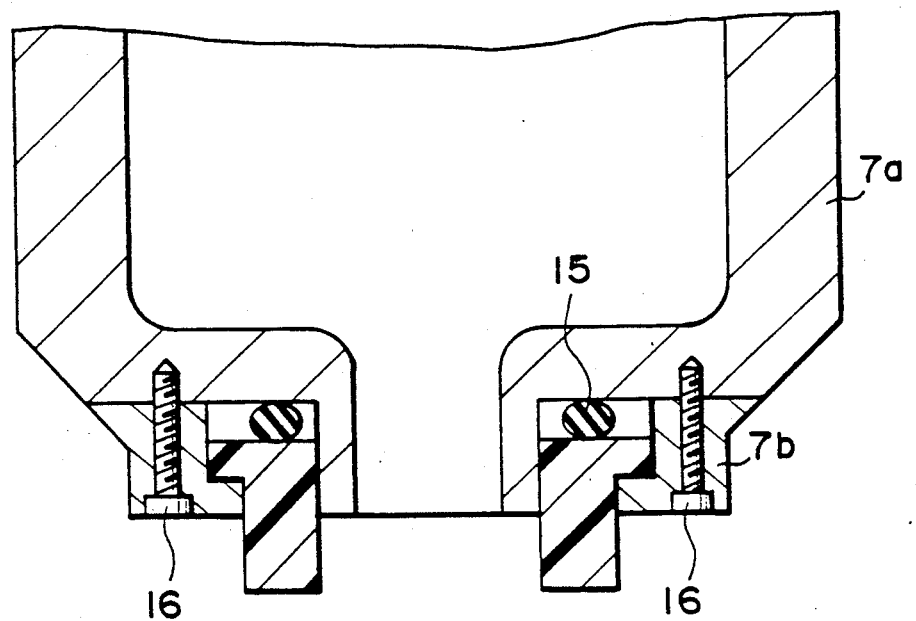

FIGS. 3A and 3B show a second embodiment of the present invention. The nozzle cap 7b is attached to the upper nozzle body 7a by bolts 16. The Teflon ring 14 is mounted and dismounted only by tightening or loosening the bolts 16. In this embodiment, the Teflon ring 14 is mounted by screwing the bolts 16 from two portions on the outer peripheral wall of the nozzle cap 7b, as shown in FIG. 3A.

Alternatively, the nozzle cap 7b may be attached to the upper nozzle body 7a by screwing the bolts 16 from the end surface of the nozzle cap which faces the workpiece, as shown in FIG. 3B.

Figure 4:
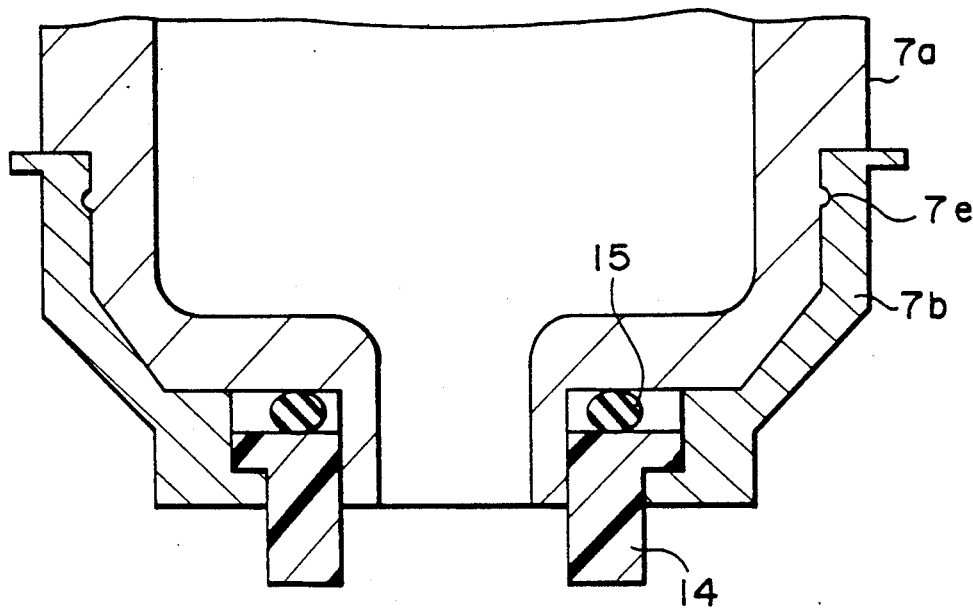
FIG. 4 is a detailed sectional view of an upper nozzle for a machining liquid and the vicinity thereof in a third embodiment of an apparatus according to the present invention.

FIG. 4 shows a third embodiment of the present invention. The nozzle cap 7b is attached to the nozzle body 7a by the engagement of the engaged portions 7e formed on the inner wall of the nozzle cap 7b and the outer wall of the upper nozzle body 7a. The nozzle cap 7b is easy to mount and dismount and, hence, the Teflon ring 14 is easy to remove.

Figure 5:
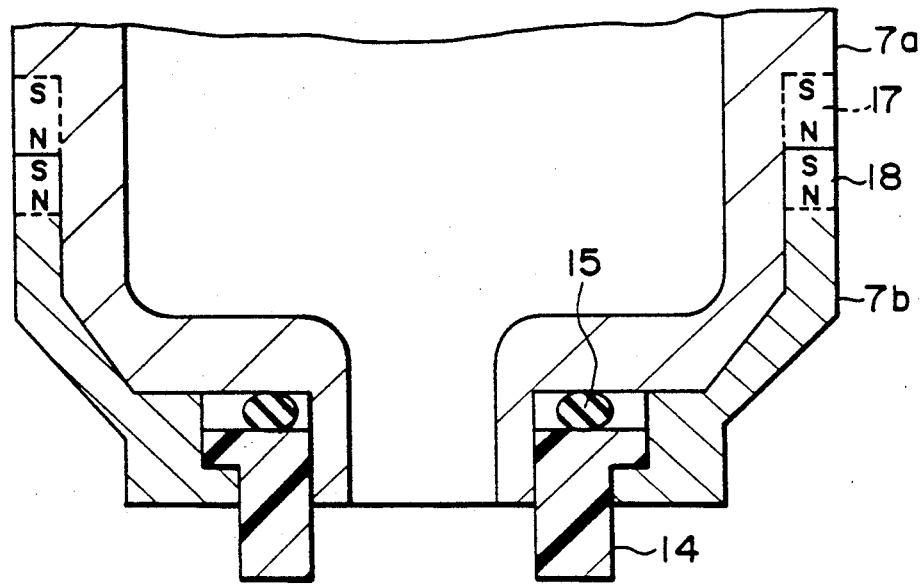
FIG. 5 is a detailed sectional view of an upper nozzle for a machining liquid and the vicinity thereof in a fourth embodiment of an apparatus according to the present invention.

FIG. 5 shows a fourth embodiment of the present invention. The nozzle cap 7b is attached to the nozzle body 7a by the attracting force of a magnet 17 provided on the surface of the nozzle body 7a facing the nozzle cap 7b and a magnet 18 provided on the nozzle cap 7b. Therefore, it is easy to replace the Teflon ring 14 by removing the nozzle cap 7b against the attracting force of the magnets 17 and 18.

Figure 6:
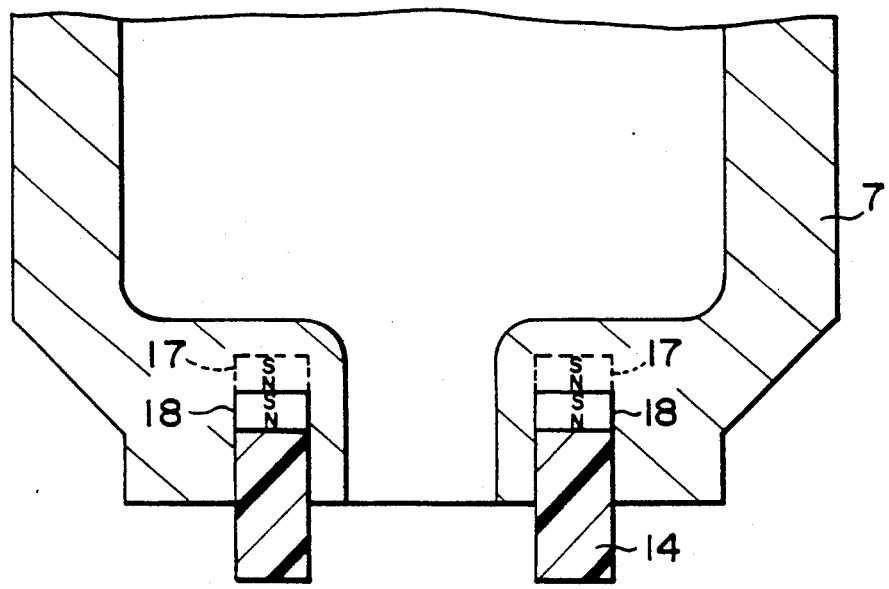
FIG. 6 is a detailed sectional view of an upper nozzle for a machining liquid and the vicinity thereof in a fifth embodiment of an apparatus according to the present invention.

FIG. 6 shows a fifth embodiment of the present invention. The surrounding member 14 is formed into a cylindrical body having no flange, and is inserted into an annular groove formed at the tip of the nozzle 7.

The surrounding member 14 is provided with a magnet attracting force, and the holding magnet 17 as a holding means is disposed at the bottom portion of the annular groove. The surrounding member 14 is held by the attracting force of these magnets.

FIG. 7 shows three patterns for providing the surrounding member 14 with a magnet attracting force in the fifth embodiment.

Figures 7A, 7B, 7C:
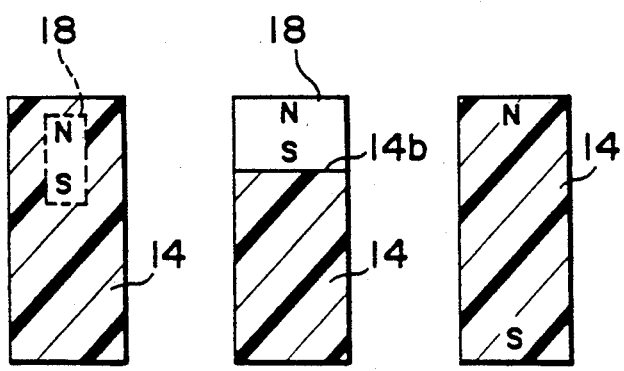
FIGS. 7A to 7C show examples of a surrounding member used for a sixth embodiment of an apparatus according to the present invention.

In FIG. 7A, the magnet 18 is embedded in the surrounding member 14. In FIG. 7B, the magnet 18 is pasted onto the close contacting end portion 14b of the surrounding member 14. In FIG. 7C, the surrounding member 14 itself is composed of a magnetic material.

In the embodiment shown in FIG. 6, the surrounding material 14 shown in FIG. 7B is adopted.

According to this embodiment, the mounting and dismounting operation of the surrounding member 14 is carried out only by mounting and dismounting the magnets 17 and 18, thereby facilitating the replacement of the surrounding member 14.

In addition, since the surrounding member 14 is attracted by the nozzle 7 by a magnetic force, even if the surrounding member 14 is separated from the workpiece 12, there is no possibility of the surrounding member 14 slipping off the nozzle 7.

Figure 8:
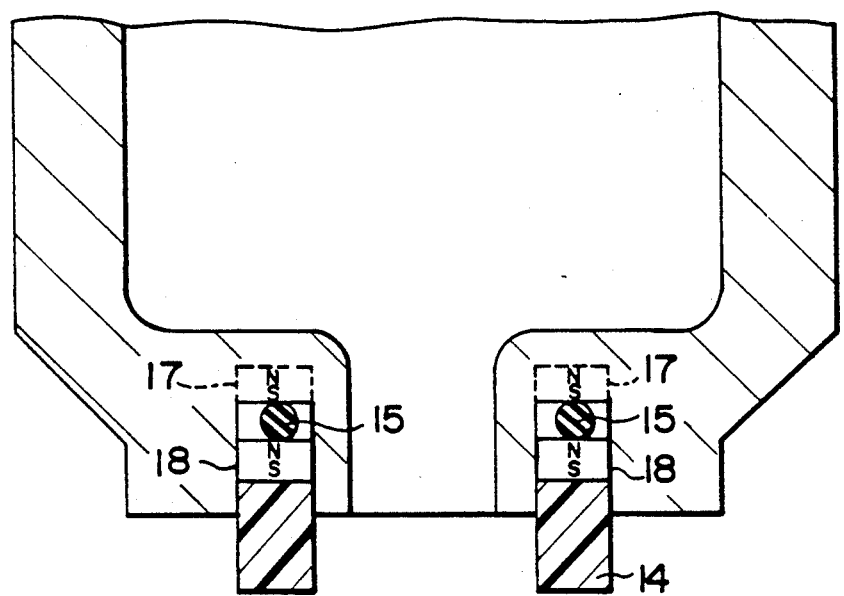
FIG. 8 is a detailed sectional view of an upper nozzle for a machining liquid and the vicinity thereof in the sixth embodiment of an apparatus according to the present invention.
Figure 9:
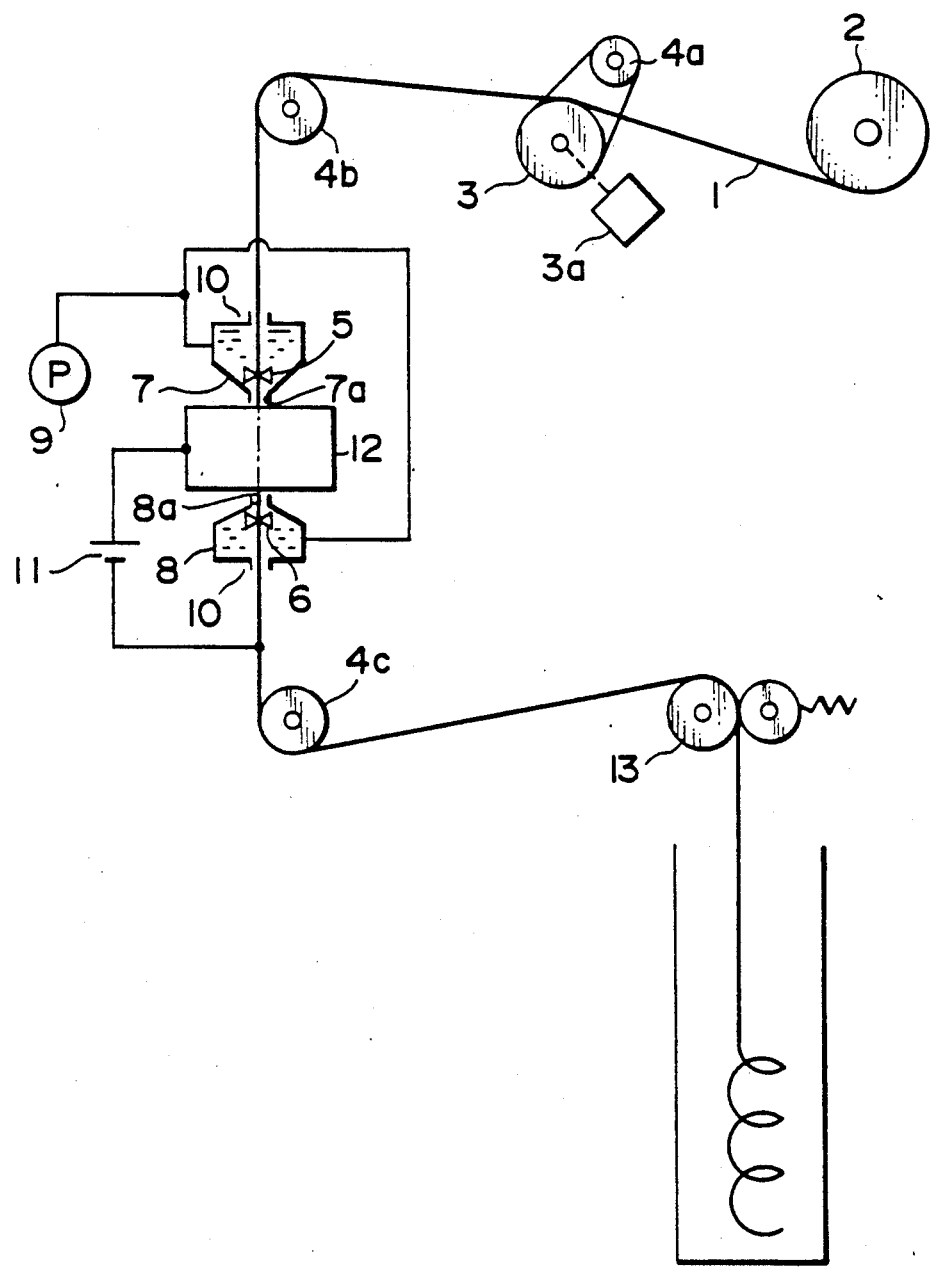
FIG. 9 shows the structure of a conventional wire discharge machining apparatus.
Figure 10:
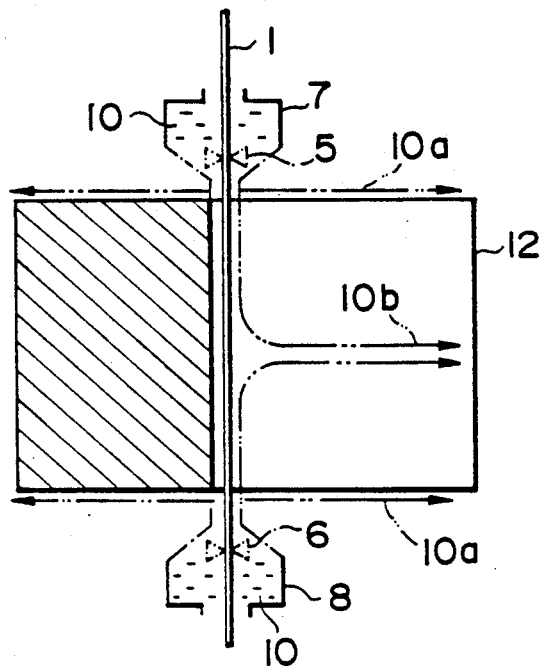
FIG. 10 is an explanatory view of the flow of the machining liquid in the conventional wire electrical discharge machining apparatus shown in FIG. 9.
Figure 11:
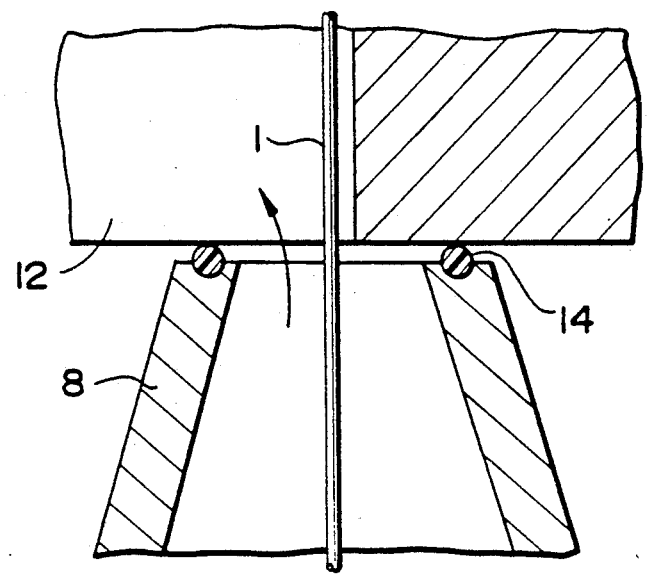
FIGS. 11, 12 and 13 are partially sectional views of other conventional wire electrical discharge machining apparatus.
Figure 12:
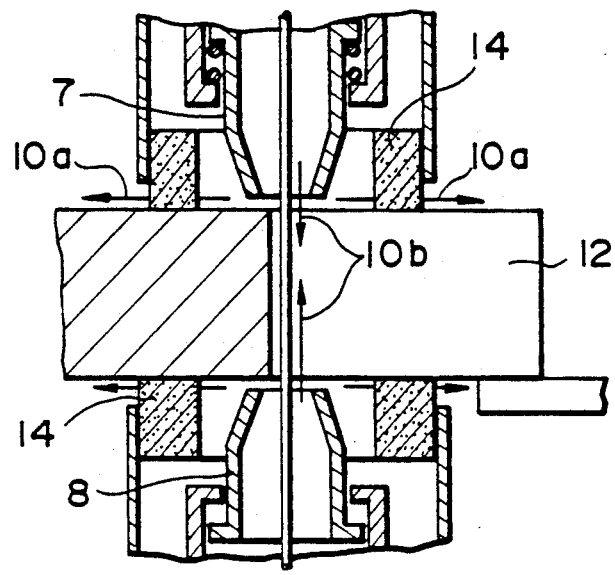
Figure 13:
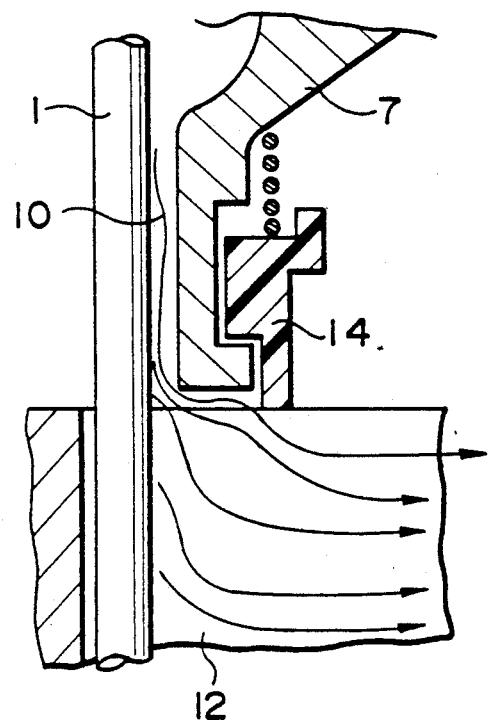

FIG. 8 shows a sixth embodiment of the present invention. In this embodiment, the elastic material 15 is interposed between the magnets 17 and 18 shown in FIG. 6, thereby facilitating the mounting and dismounting operation of the surrounding material 14. An O-ring is used as the elastic material 15. The provision of the O-ring 15 brings the surrounding member 14 into closer contact with the workpiece as in the first embodiment shown in FIG. 1.

As described above, according to the present invention, since a surrounding member for intercepting the flow of a machining liquid and supplying the machining liquid to a spark gap is removably held at the tip portion of a nozzle, when the surrounding member is worn or broken, it is easily replaced. In addition, since the slip-off of the surrounding member is prevented, the maintenance and the handling property of the apparatus are enhanced.

While there has been described what are at present considered to be preferred embodiments of the invention, it will be understood that various modifications may be made thereto, and it is intended that the appended claims cover all such modifications as fall within the true spirit and scope of the invention.

What is claimed is:
1. A wire electrical discharge apparatus comprising:
a nozzle for a machining liquid which is provided in such a manner as to face a workpiece at least on one side of the wire electrode receiving surface side and the wire electrode feeding surface side of said workpiece so as to insert a wire electrode therethrough and which has a jet hole for jetting said machining liquid to said workpiece therethrough;
a surrounding member which is a cylindrical body surrounding said wire electrode, one end portion of said surrounding member being a contacting end portion which can be brought into close contact with said workpiece; and
a holding means for holding said surrounding member at the tip of said nozzle so as to be removable and not to easily slip off such that said contacting end portion faces said workpiece and a close contacting end portion on the opposite side of said contacting end portion comes into close contact with the periphery of said jet hole of said nozzle, said surrounding member being provided with a projected portion at said close contacting end portion opposite to said contacting end portion.

2. A wire electrical discharge apparatus comprising:
a nozzle for a machining liquid which is provided in such a manner as to face a workpiece at least one side of the wire electrode receiving surface side and the wire electrode feeding surface side of said workpiece so as to insert a wire electrode therethrough and which has a jet hole for jetting said machining liquid to said workpiece therethrough;
a surrounding member which is a cylindrical body surrounding said wire electrode, one end portion of said surrounding member being a contacting end portion which can be brought into close contact with said workpiece; and
a holding means for holding said surrounding member at the tip of said nozzle so as to be removable and not to easily slip off such that said contacting end portion faces said workpiece and a close contacting end portion on the opposite side of said contacting end portion comes into close contact with the periphery of said jet hole of said nozzle, wherein said surrounding member is provided with a flange at said close contacting end portion opposite to said contacting end portion; and said holding means is a nozzle cap which has an opening at the end thereof so as to allow said contacting portion of said surrounding member to penetrate therethrough at the time of attachment and which is removably attached to the tip of said nozzle so as to hole said surrounding member while pressing said flange toward said nozzle by the inner edge of said opening.

3. A wire electrical discharge apparatus according to claim 2, wherein an O-ring made of an elastic material is interposed between said surrounding member which is held by said nozzle cap and the tip of said nozzle.

4. A wire electrical discharge apparatus according to claim 3, wherein said nozzle cap is attached to the tip of said nozzle by engaging a screw portion provided on the outer surface of the cap attachment portion of said nozzle with a screw portion provided on the inner surface of said nozzle cap so as to be engageable with said screw portion.

5. A wire electrical discharge apparatus according to claim 3, wherein said nozzle cap is attached to the tip of said nozzle by screwing bolts from the outer peripheral wall of said nozzle cap into the outer peripheral wall of said nozzle in the state in which said nozzle cap is mounted on the tip of said nozzle.

6. A wire electrical discharge apparatus according to claim 3, wherein said nozzle cap is attached to the tip of said nozzle by screwing bolts from the end surface of said nozzle cap facing said workpiece into the end surface of said nozzle in the state in which said nozzle cap is mounted on the tip of said nozzle.

7. A wire electrical discharge apparatus according to claim 3, wherein said nozzle cap is attached to the tip of said nozzle by the engagement of engaging portions provided on the outer wall of the tip of said nozzle and on the inner wall of said nozzle cap so as to be engageable with each other.

8. A wire electrical discharge apparatus according to claim 3, wherein said nozzle cap is attached to the tip of said nozzle by the attraction of magnets provided on the opposing faces of said nozzle cap and said nozzle so as to attract each other.

9. A wire electrical discharge apparatus comprising:
a nozzle for a machining liquid which is provided in such a manner as to face a workpiece at least on one side of the wire electrode receiving surface side and the wire electrode feeding surface side of said workpiece so as to insert a wire electrode therethrough and which has a jet hole for jetting said machining liquid to said workpiece therethrough;

a surrounding member which is a cylindrical body surrounding said wire electrode, one end portion of said surrounding member being a contacting end portion which can be brought into close contact with said workpiece; and a holding means for holding said surrounding member at the tip of said nozzle so as to be removable and not to easily slip off such that said contacting end portion faces said workpiece and a close contacting end portion on the opposite side of said contacting end portion comes into close contact with the periphery of said jet hole of said nozzle; wherein said surrounding member has a magnet attracting force; and said holding means is composed of a holding magnet disposed in said nozzle so as to relatively attract said magnet attracting force of said surrounding member.

10. A wire electrical discharge apparatus according to claim 9, wherein said nozzle is provided at the tip thereof with an annular groove for receiving said close contacting portion of said surrounding member on the opposite side of said contacting portion; and said holding magnet is disposed at the bottom portion of said annular groove.

11. A wire electrical discharge apparatus according to claim 10, wherein an O-ring made of an elastic material is interposed between said holding magnet disposed at the bottom portion of said annular groove and said close contacting end of said surrounding member which is inserted into said annular groove.

12. A wire electrical discharge apparatus according to claim 10, wherein said magnet attracting force of said surrounding member is produced by embedding a magnet in said surrounding member.

13. A wire electrical discharge apparatus according to claim 10, wherein said magnet attracting force of said surrounding member is produced by attaching a magnet to said close contacting side of said surrounding member.

14. A wire electrical discharge apparatus according to claim 10, wherein said magnet attracting force of said surrounding member is produced by adopting a magnetic material as said surrounding member itself.

* * * * *